United States Patent
Cotignola et al.

(10) Patent No.: US 8,804,926 B2
(45) Date of Patent: Aug. 12, 2014

(54) COMMUNICATING MODEM OR MULTIMEDIA TERMINAL ADAPTER STATUS TO A HANDSET FOR A CORDLESS TELEPHONE

(75) Inventors: Christopher J. Cotignola, Doylestown, PA (US); Dipak R. Patel, Hatboro, PA (US)

(73) Assignee: Motorola Mobility LLC, Libertyville, IL (US)

( * ) Notice: Subject to any disclaimer, the term of this patent is extended or adjusted under 35 U.S.C. 154(b) by 1165 days.

(21) Appl. No.: 11/766,487

(22) Filed: Jun. 21, 2007

(65) Prior Publication Data

US 2008/0317225 A1   Dec. 25, 2008

(51) Int. Cl.
 *H04M 11/00* (2006.01)
(52) U.S. Cl.
 USPC .............. 379/93.05; 379/32.01; 379/92.04; 379/377
(58) Field of Classification Search
 USPC ......... 379/32.01, 92.04, 93.01, 93.05, 370, 379/424, 428.02, 377
 See application file for complete search history.

(56) References Cited

U.S. PATENT DOCUMENTS

| | | | |
|---|---|---|---|
| 5,371,783 A * | 12/1994 | Rose et al. | 455/464 |
| 7,088,708 B2 * | 8/2006 | Owens et al. | 370/355 |
| 7,409,451 B1 * | 8/2008 | Meenan et al. | 709/227 |
| 7,881,733 B2 * | 2/2011 | Staton et al. | 455/456.6 |
| 2004/0218583 A1 * | 11/2004 | Adan et al. | 370/352 |
| 2005/0068938 A1 * | 3/2005 | Wang et al. | 370/352 |
| 2008/0080703 A1 * | 4/2008 | Penning et al. | 379/428.02 |
| 2008/0085746 A1 * | 4/2008 | Ray et al. | 455/575.1 |
| 2009/0013210 A1 * | 1/2009 | McIntosh et al. | 714/4 |

* cited by examiner

*Primary Examiner* — Duc Nguyen
*Assistant Examiner* — Yosef K Laekemariam
(74) *Attorney, Agent, or Firm* — Lerner, David, Littenberg, Krumholz & Mentlik, LLP

(57) ABSTRACT

A cordless telephone system provides indication of event information for customer premises equipment. The cordless telephone system includes a base station and handsets. The base station receives event information from the CPE. The base station transmits the event information to a handset, and the handset provides an indication of the event information to a user.

3 Claims, 3 Drawing Sheets

COMMUNICATING MODEM OR MULTIMEDIA TERMINAL ADAPTER STATUS TO A HANDSET FOR A CORDLESS TELEPHONE

FIELD OF INVENTION

Disclosed herein are various embodiments relating to communicating a status of a modem, multimedia terminal adapter or other customer premises equipment to a handset for a cordless telephone system.

BACKGROUND

Conventional customer premises equipment (CPE) includes a modem connected to an Internet service provider's network, providing the customer with Internet access via the modem. Typically, the customer premises includes a wireless network with a wireless router. The modem is connected to the wireless router so any computer or device connected to the wireless network can access the Internet via the modem.

A customer premises may also include a media terminal adapter (MTA). The MTA interfaces with an IP network, for example, via a modem, and is operable to adapt voice-over-internet-protocol (VoIP) data for use by CPE devices, such as telephones inside the customer premises. The MTA may be embedded in a modem, such as a cable modem or DSL modem. The embedded MTA is referred to as an eMTA and integrated with the modem as a single device. The MTA may instead be provided as a standalone device connected to the modem.

Some CPE may generate operational status indications, so users can determine the operational status of CPE. For example, in order to provide an indication of the operation of the modem, the modem typically includes LEDs on its housing. For example, LEDs are activated to indicate that the modem is ON and communicating with other devices. In another example, a router may be accessed through a web-based graphical user interface (GUI). For example, if an IP device for a router in the wireless network is known, the user may access the web-based GUI for the router through a computer system connected to the wireless network. The web-based GUI may provide some status information for the router, as well as modifiable settings.

In many instances, the modem and router are provided in an out-of-the-way location at the customer premises. For example, these devices may be located in a basement or in a closet at the customer premises. Thus, if the user is troubleshooting a bad or down Internet connection or otherwise needs to get status information for these devices, the user must go to the location of these devices in the customer premises to view the LEDs on these devices. If these devices are located in an out-of-the-way location at the customer premises, this tends to be an annoying and time-consuming task. Alternatively, if status information is available via the web-based GUI, the user must access the web-based GUI via a computer. However, some users may not have a personal computer (PC) to view the web-based GUI to get status information, or some users may not have the knowledge to use a PC to access the web-based GUI. In other instances, a web-based GUI may not be provided for some devices.

SUMMARY

A cordless telephone system provides indication of event information for customer premises equipment. The cordless telephone system includes a base station and handsets. The base station receives event information from the CPE. The base station transmits the event information to a handset, and the handset provides an indication of the event information to a user. By providing event information via a handset, existing devices in the customer premises that are typically readily available to the user in the customer premises may be used to conveniently provide event information to a user.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Figure 1:
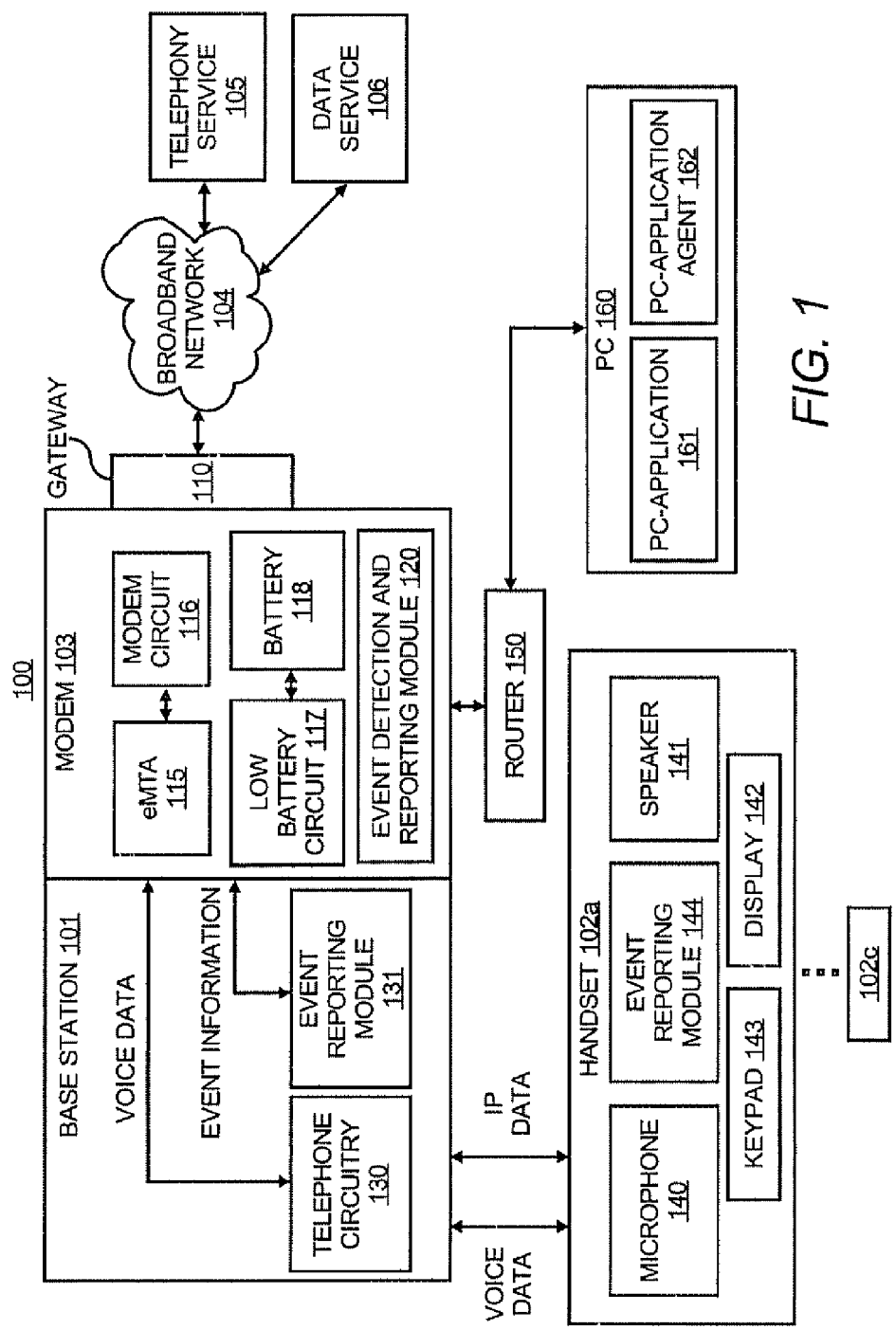
FIG. 1 illustrates a system, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a modem and MTA are connected to a base station of a cordless telephone system. The cordless telephone system includes at least one wireless handset connected to the base station. In addition to providing conventional operation of a cordless telephone system, such as making and receiving calls, the base station is operable to provide event information to the handset. The event information may include but is not limited to status information for the modem, eMTA, or router, such as low or dead backup battery, ON or OFF status, and other information, such as head-end failing to respond in the case of the eMTA embedded in a cable modem, a cut cable connecting the customer premises to the broadband network, etc. General categories of event information include but are not limited to loss of connectivity to Internet; no loss of Internet connection but loss of telephony/VoIP service; status of backup unit and/or status of battery; cut cable information; and performance metrics for a network or application. These categories are generally related to and may affect the communication conditions for the network, the modem and the base station.

Regarding the performance metrics category, examples of performance metrics for a network may include but are not limited to bandwidth, field strength for wireless communications, etc. Performance metrics for applications may be associated with network applications, such as VoIP or messaging applications. For example, performance metrics for a VoIP application may be provided on a per call or for a time period. They may indicate information related to voice quality during the call, length of the call or calls and other call-related information.

Another event category is PC-application-based-events. Examples of these events include receipt of email, instant message or text messages. The base station may provide notification of these events to a user via a handset.

The system provides the user with the conveniences of receiving event information via a handset for the cordless telephone system, so the user does not need to view LEDs on the CPE or access the CPE via web-based GUI to get status information. Also, event information may be automatically provided to the user. For example, if a modem's battery is low or dead, an alert may be generated on the handset, or if the Internet connection is down, the user may be alerted via the handset. Also, the user may request event information from CPE via a base station using the handset.

FIG. 1 illustrates a system 100, according to an embodiment. The system 100 includes a cordless telephone system including a base station 101 and one or more handsets 102a-c. The cordless telephone system is capable of operating as a conventional cordless telephone. For example, the cordless telephone system may be connected to a plain old telephone service (POTS) network to provide telephony service for a user. The cordless telephone system may also provide VoIP and other data services.

The base station 101 is connected to CPE and is operable to receive event information from the CPE. CPE includes any terminal and associated equipment at a subscriber's premises. Some CPE includes terminal and associated equipment connected with a broadband network via a gateway at the subscriber's premises. A modem, such as a cable model or digital subscriber line (DSL) modem, MTA, and eMTA are examples of CPE connected to a broadband network via a gateway. Other examples of CPE, which may be connected to a broadband network, include routers, settop boxes and end user devices, such as PCs, phones, etc.

FIG. 1 shows the base station 101 connected to a modem 103. The modem 103 is connected to a broadband network 104 via a gateway 110. The gateway 110 connects the service provider's network with wiring and CPE at the customer premises and may be provided by the service provider. The service provider may include a telephone or cable service provider that may also provide Internet service. The broadband network 104 may include the Internet and other private or public networks, including the service provider's network, external to the customer premises.

The modem 103 includes an eMTA 115 and a modem circuit 116. The modem circuit 116 operates as a modem, as is known in the art, to modulate and demodulate data received from or transmitted to the broadband network 104. The eMTA 115 interfaces with the broadband network 104 via the modem circuit 116 and is operable to adapt VoIP data for use by CPE, such as telephones, PCs, etc.

The modem 103 is operable to detect an event and provide event information describing the event to the base station 101. The events and event information describing the events may include but is not limited to status information for the modem, such as low or dead backup battery, ON or OFF status, and connection status, such as loss of Internet connection, detection of cut or broken cable connecting the gateway 110 and the broadband network 104, and loss of telephony service (POTS or VoIP).

The eMTA 115 and the modem circuit 116 may detect events and provide the corresponding event information describing the events to the base station 101. As is known in the art other circuits in the modem 103 may also detect events. For example, the modem 103 may include a low battery circuit 117 connected to a back-up battery 118 to detect when the battery 118 is low or not functioning. In one embodiment, software running on a processor in the modem 103 detects events and generates the corresponding event information for transmission to the base station 101. For example, event detection and reporting module 120 includes software running on the modem 103 that receives indication of detection of events from the eMTA 115, the modem circuit 116, the low battery circuit 117 and other circuits and generates corresponding event information, which is transmitted to the base station 101. Also, although these circuits are shown as separate circuits, many of the circuits may share components. For example, a single processor may perform the functions of multiple circuits.

FIG. 1 shows voice data and event information communicated between the modem 103 to the base station 101. Voice data may include VoIP data. Also, other types of digital data may be transmitted to the base station 101 from CPE. Although not shown, a POTS network may be connected to the base station 101 to provide conventional POTS telephony service.

The base station 101 provides voice data to the handsets 102a-c for telephone calls. This may include VoIP or POTS data. In addition, the base station 101 provides event information received from CPE, including the modem 103, to handsets 102a-c. The event information may be wirelessly transmitted to the handsets 102a-c. FIG. 1 illustrates voice data and event information transmitted to only the handset 102a, but the other handsets may also receive and transmit voice data, event information and other data.

The handsets 102a-c may be cordless handsets connected to the base station 101 via radio frequency (RF). Wireless communication between the handsets 102a-c and the base station 101 may be performed using the DECT 6.0 protocol or another conventional protocol for cordless telephone systems. In an embodiment, the handsets 102a-c may have the ability to connect directly to the base station 101 via a wire, cable, cord, etc., or by direct physical contact between the handset 207 and the base station 101. For example, the base station 101 may be configured to act as a "cradle" to receive and provide power to the handset 102a. When connected to the base station 101 in the manner described in this example, the handset 102a may send and receive both voice data and other data to/from the base station 101. However, the primary mode of operation may be wireless connection between the handsets 102a-c and the base station 101.

The base station 101 may include telephony circuitry 130, as is known in the art, for communicating the voice data to and from the handsets 102a-c. In one embodiment, the base station 101 may also include software, such as the event reporting module 131, reporting received event information to the handsets 102a-c. The event reporting module 131, for example, sends event information received from CPE to one or more of the handsets 102a-c.

The handset 102a includes input and output (I/O) devices and other circuits, not shown, for providing conventional functionality for facilitating telephone calls. Examples of the I/O devices include a microphone 140, a speaker 141, display 142 and keypad 143. The handset 102a may also include software reporting received event information, such as event reporting module 144. For example, the event reporting module 144 may provide event information via the display 142 or the speaker 141. If a display, such as an LCD is provided, a description of the event can be provided via the display. A display may also include LEDs. An audio indication of event information may be provided via the speaker 141. In one embodiment, the event reporting module 144 determines whether the handset 102a is being used for a call in progress, which may be detected from an on-hook or off-hook status. If a call is in progress, the display 142 may be used instead of the speaker 141 to provide event information so as not to interrupt the telephone call.

Although not shown, the handsets 102b and 102c may include components similar to those shown for the handset 102a. Also, one or more of the handsets 102a-c may be multimode handsets. For example, a cellular phone may be used as a conventional phone or as a handset for the cordless telephone system 100. For example, if the cellular phone is within range of the base station 101 and the base station 101 detects the cellular phone, the cellular phone may send and receive calls and other services via the base station 101 and also receive event information from the base station 101.

Event information may be pushed to the handsets 102a-c. For example, event information generated by the CPE is automatically transmitted to the base station 101 and the handsets 102a-c without requiring the handsets 102a-c to request the event information. Event information may also be pulled by the handsets 102a-c. For example, the handset 102a may send a request for event information to the base station 101, and the base station 101 sends a request to CPE to send event information. In one example, the handset 102a desires to determine network performance metrics for a wireless local area network (LAN) at the premises. The handset 102a sends a request to the base station for the LAN network performance metrics. The base station 101 sends a request for the metrics to a router 150, and the router 150 sends the event information, i.e., the requested metrics, to the base station 101. The base station 101 sends the metrics to the handset 102a, and the metrics are provided to the user, for example, via the display 142, in the handset 102a. The router 160 may send other types of event information, besides performance metrics, to the base station 101 and the handsets 102a-c.

Another type of CPE that may send event information to the base station 101 and the handsets 102a-c includes end user devices, such as a PC 160. For example, the PC 160 sends PC-application event information to the base station 101. The PC 160 runs software applications, referred to as PC-applications. FIG. 1 shows a PC-application 161 running on the PC 160. Examples of PC-applications include but are not limited to email applications, instant messaging applications, etc. A PC-application agent 162 may be running on the PC 160 and detect events for the PC application 161. For example, the PC-application 161 is an email application, and the PC-application agent 162 determines when a new email is received. If a new email is received, event information indicating that a new email is received is transmitted to the base station 101 and the handsets 102a-c. The PC 160 may be operable to send other types of event information to the base station 101.

The PC 160 is shown connected to the base station 101 via the router 150 by way of example. In other embodiments, the PC 160 may communicate directly with the base station 101.

The base station 101 and the modem 103 may be integrated as a single platform or device. The modem 103 and the base station 101 together are referred to as a media terminal device, which is operable to send and receive data to and from the broadband network 104. In one example, the integrated platform comprising the modem 103 and the base station 101 is the media terminal device. Other components may also be integrated in the media terminal device. In other embodiments, the modem 103 is a separate standalone device connected via a wired or wireless connection with the base station 101. Also, the router 160, which is shown as a standalone device, may be integrated in the platform with the modem 103 and the base station 101. Also, the MTA is shown embedded in the modem 103, but the MTA may be a standalone device.

Various modules are described above, including event detection and reporting modules, as software. It will be apparent to one of ordinary skill in the art that the modules may be implemented as software, hardware or a combination of hardware and software. Also, it will be apparent to one of ordinary skill in the art that the CPE, base station 101 and handsets may include many conventional circuits and software not shown so as not to unnecessarily obscure the embodiments.

Figure 2:
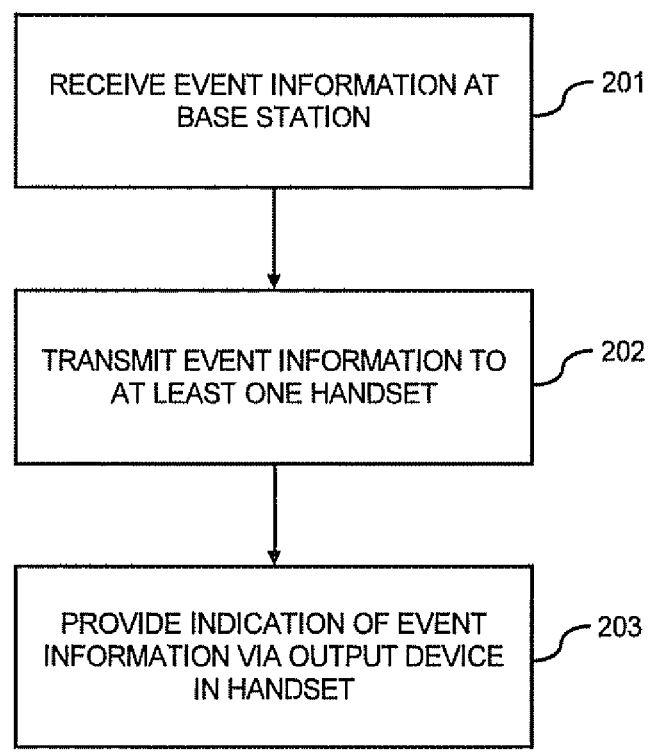
FIG. 2 illustrates a method for providing event information using a cordless telephone system, according to an embodiment.

FIG. 2 depicts a flow chart of a method 200 for providing event information through a cordless telephone system, according to an embodiment. The method 200 is described with respect to the system shown in FIG. 1 by way of example, and the method 200 may be practiced in other systems.

At step 201, event information is received at a cordless telephone system base station from CPE. For example, the base station 101 shown in FIG. 1 receives event information from CPE, such as the modem 103, router 150, and PC 160.

At step 202, the base station transmits the event information to at least one handset of the cordless telephone system. For example, the base station 101 transmits event information received from CPE to the handset 102a. The base station 101 may transmit the event information to all the handsets 102a-c or one or some of the handsets based on user preferences that are selected at the base station or based on other criteria, such as whether the handset is functional, in-use, etc.

At step 203, the handset receiving the event information provides an indication of the event information to a user via at least one output device in the handset. For example, the display 142 or the speaker 141 in the handset 102a is used to output event information to the user.

Figure 3:
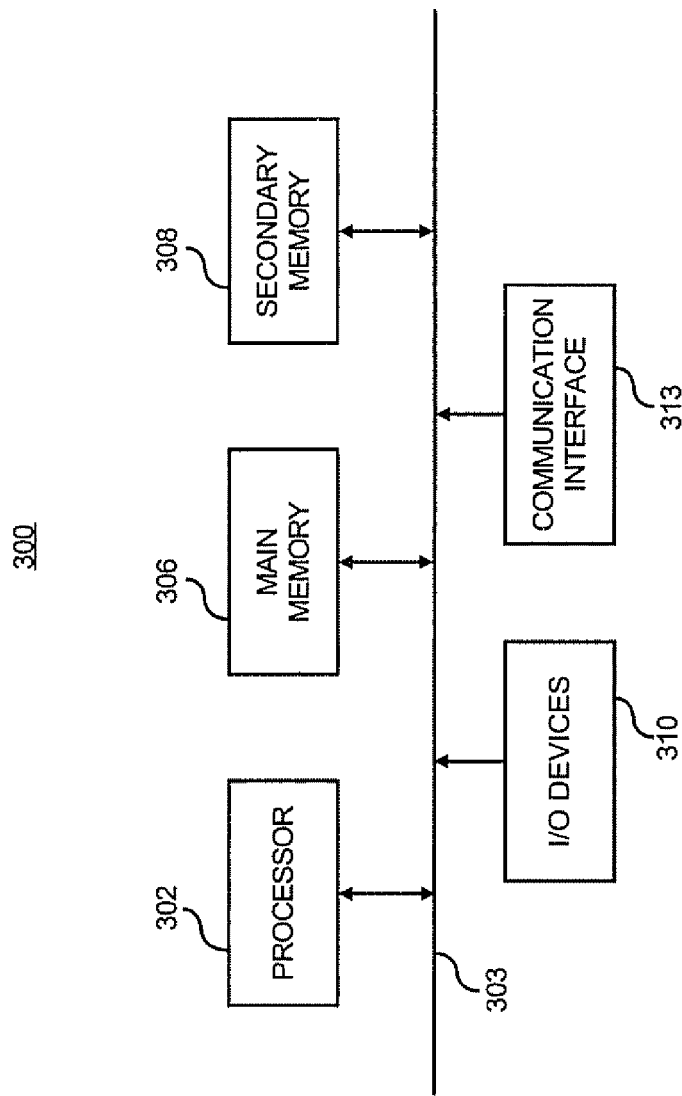
FIG. 3 illustrates a general purpose computer system, according to another embodiment.

FIG. 3 illustrates a block diagram of a general purpose computer system 300 that is operable to be used as a platform for the components of the system 100 described above. The general purpose system 300 may be used as, or may comprise a part of the handset 102a, the base station 101, or CPE. Furthermore, components may be added or removed from the general purpose system 300 to provide the desired functionality.

The system 300 includes a processor 302, providing an execution platform for executing software. Commands and data from the processor 302 are communicated over a communication bus 303. The system 300 also includes a main memory 306, such as a Random Access Memory (RAM), where software may reside during runtime, and a secondary memory 308. The secondary memory 308 may include, for example, a nonvolatile memory where a copy of software is stored. In one example, the secondary memory 308 also includes ROM (read only memory), EPROM (erasable, programmable ROM), EEPROM (electrically erasable, programmable ROM).

In one embodiment, the processor 302 is a microprocessor in the modem 103 or in a media terminal device comprised of the base station 101 and the modem 103. The processor 302 monitors communication conditions associated with the network, the modem and the base station. This may include detecting events. Also, the processor 302 provides event information associated with the communication conditions. For example, the processor 302 runs the event detection and reporting module 102, which provides event information to the base station 101. The base station 101 may report the event information to a handset.

The system 300 includes I/O devices 310. The I/O devices may include a display and/or user interfaces comprising one or more I/O devices 310, such as a keyboard, a mouse, a stylus, speaker, and the like. A communication interface 313 is provided for communicating with other components. The communication interface 313 may be a wired or a wireless interface. The communication interface 313 may be a network interface.

One or more of the steps described herein are operable to be implemented as software stored on a computer readable medium, such as the memory 306 and/or 308, and executed on the system 300, for example, by the processor 302.

The steps are operable to be embodied by a computer program, which can exist in a variety of forms both active and inactive. For example, they exist as software program(s) comprised of program instructions in source code, object code, executable code or other formats for performing some of the steps. The codes described above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A cordless telephone system for use at a customer's premises, the system comprising:
    a cordless telephone base station;
    a cordless telephone handset configured to communicate wirelessly with the cordless telephone base station and physically connect to the cordless telephone base station to receive power therefrom, the cordless telephone base station including a display; and
    a modem connected to the cordless telephone base station and having broadband connectivity, the modem being capable of establishing an Internet connection over a broadband network,
    wherein when the modem detects the loss of the Internet connection, the modem transmits information regarding the connection loss to the cordless telephone handset via the cordless telephone base station,
    wherein the cordless telephone handset outputs the information on the display,
    further wherein the modem is further configured to communicate with a personal computer in the customer's premises, receive information therefrom regarding an event relating to a software application executing on the personal computer, and transmit the information to the cordless telephone handset,
    wherein the cordless telephone handset outputs software application event on the display.

2. The system of claim 1,
    wherein the modem is further configured to communicate with a personal computer in the customer's premises, receive information therefrom indicating that a new email has been received at the personal computer, and transmit the information to the cordless telephone handset,
    wherein the cordless telephone handset outputs the new email information on the display.

3. The system of claim 1,
    wherein the modem is further configured to communicate with a personal computer in the customer's premises, receive information therefrom indicating that a new instant message has been received at the personal computer, and transmit the information to the cordless telephone handset,
    wherein the cordless telephone handset outputs the new instant message information on the display.

* * * * *

UNITED STATES PATENT AND TRADEMARK OFFICE
CERTIFICATE OF CORRECTION

Page 1 of 1

PATENT NO. : 8,804,926 B2
APPLICATION NO. : 11/766487
DATED : August 12, 2014
INVENTOR(S) : Cotignola et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1306 days.

Signed and Sealed this
Fifteenth Day of September, 2015

Michelle K. Lee
*Director of the United States Patent and Trademark Office*